US011604938B1

(12) United States Patent
Chen

(10) Patent No.: US 11,604,938 B1
(45) Date of Patent: Mar. 14, 2023

(54) SYSTEMS FOR OBSCURING IDENTIFYING INFORMATION IN IMAGES

(71) Applicant: AMAZON TECHNOLOGIES, INC., Seattle, WA (US)

(72) Inventor: Julius Chen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/901,619

(22) Filed: Jun. 15, 2020

(51) Int. Cl.
  *G06T 5/00* (2006.01)
  *G06K 9/62* (2022.01)
  *G06V 40/16* (2022.01)

(52) U.S. Cl.
  CPC ......... *G06K 9/6256* (2013.01); *G06K 9/6265* (2013.01); *G06T 5/002* (2013.01); *G06V 40/162* (2022.01); *G06V 40/172* (2022.01)

(58) Field of Classification Search
  CPC .......... G06T 2207/20081; G06T 2207/20084; G06T 5/002; G06N 3/02–3/105; G06N 20/00–20/20; G06K 9/00221–2009/00328
  See application file for complete search history.

(56) References Cited

U.S. PATENT DOCUMENTS

| 10,657,361 | B2* | 5/2020 | Appleyard | G06K 9/00288 |
| 2014/0010416 | A1* | 1/2014 | Tanaka | G06K 9/00221 382/118 |
| 2018/0374431 | A1* | 12/2018 | Adams | G06F 21/84 |
| 2020/0395105 | A1* | 12/2020 | Koby | G16H 40/00 |

* cited by examiner

*Primary Examiner* — Brian Werner
(74) *Attorney, Agent, or Firm* — Lindauer Law, PLLC

(57) ABSTRACT

A camera in a facility acquires an image of a user performing an action, such as shopping. These images may include potentially identifying information, such as an image that includes the user's face. To safeguard privacy of the user, a modified image is generated by changing one or more characteristics of the acquired image. The modification affects the entire image, rendering the resulting image unsuitable for another person to identify the user. For example, a contrast value for the image may be changed, rendering the user unrecognizable. This modification removes the potentially identifying information before later processing takes place. For example, the modified image in which the user's face is obscured may retain other non-identifying information used to train an artificial neural network to recognize actions such as pick or place of items in the facility.

20 Claims, 4 Drawing Sheets

SYSTEMS FOR OBSCURING IDENTIFYING INFORMATION IN IMAGES

BACKGROUND

Videos and images that depict users performing activities may be used as inputs to train machine learning algorithms to identify the actions performed by users. However, the videos and images may include identifying information, such as faces of users, which may present privacy concerns if seen by other viewers. Processes to deidentify the videos and images may be subject to inaccuracy, use of computational resources, or may render a video or image unsuitable for use as a training input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
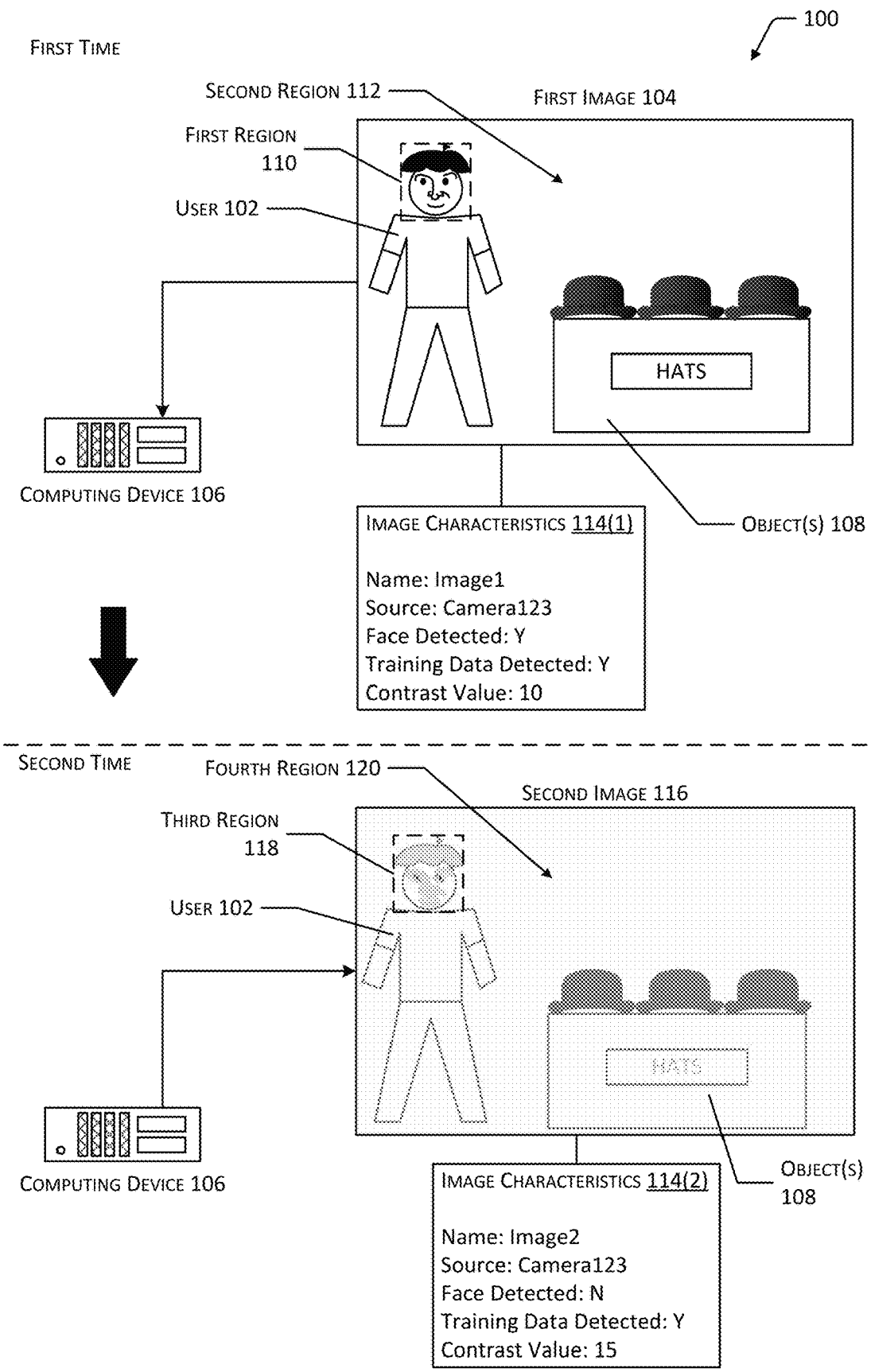
FIG. 1 depicts an implementation of a system for modifying an image to remove information that may be used to identify a particular user while retaining other information that may be used to perform a function.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Images that depict users performing activities may be used for a variety of purposes. For example, an image may be used as an input to train a neural network or other type of machine learning algorithm to identify actions performed by users. Images used to train a neural network may include still images or frames of a video. Continuing the example, images of a user within an automated store may be analyzed by a neural network to determine items that were removed from shelves by the user, items that were returned to shelves, and so forth, so that items that were purchased by the user may be properly accounted for. As another example, images of a user within a warehouse or other storage facility may be analyzed by a neural network to determine items that were stored or removed, and the locations within the facility at which the items were stored or removed. As yet another example, images that depict users performing actions may be analyzed by a neural network for security purposes, such as detecting prohibited activities or the presence of users in a restricted area. As another example, images that depict users performing actions may be analyzed by a neural network for safety purposes, such as by detecting movement or positions of a user that may indicate a fall, injury, unconsciousness, and so forth.

To improve the accuracy by which a neural network or other type of machine learning algorithm is able to identify actions performed by users, the algorithm is trained using existing images as inputs. For example, when a user opts-in or otherwise provides authorization for acquisition of images that depict the user performing an activity, the images may be temporarily stored for use as inputs to train a machine learning algorithm. However, images that are acquired in this manner may sometimes include information, such as a face, that may enable a specific user to be identified. To protect the privacy and anonymity of the user by preventing access to identifying information, images may be deidentified prior to temporary storage. Some methods of deidentification, however, may prevent the images from being useful as inputs to train a machine-learning algorithm. For example, if an image that includes a face of a user or other identifiable information is pixelated, blurred, or otherwise obscured, this process may obscure useful data, such as interactions between the user and other objects in the image. In such a case, the image may no longer be useful as an input to train a machine learning algorithm.

Other processes to prevent access to identifying information in an image may include identifying portions of the image that include a face of a user, then obscuring only those portions of the image. However, processes to determine and obscure only selected portions of an image are reliant upon the accuracy of object recognition algorithms to determine the presence of this information. These processes also use computational resources to both detect this information and obscure this information within the images. For example, accurately locating the face of a user within each frame of a video and obscuring only this portion of each frame consumes computational resources and may be subject to inaccuracy. As a result, images processed in this manner may inadvertently retain identifying information.

Described in this disclosure are computationally efficient techniques for deidentifying images while retaining information suitable for training a machine learning algorithm or for manual processing. Deidentifying images may include obscuring identifying information in the images to protect the privacy and anonymity of users. Obscuring identifying information may include modifying an image so that a viewer is unable to identify a particular user depicted in the modified image.

A camera may be used to acquire images that depict performance of an action by a user that has authorized use of images for this purpose. In some implementations, the techniques described herein may be performed by a processor in the camera, or another computing device in communication with the camera, before transmitting the images to a server or other computing device. In other implementations, the camera may transmit acquired images to another computing device, such as a server, to be deidentified. In some implementations, prior to performing the process described herein, an image may be analyzed to determine whether the image includes a face of a user or other identifying information. In other implementations, the techniques described herein may be applied to an image independent of whether a face or other identifying information is detected. For example, all videos from a particular source, such as a camera that monitors an automated store, may be processed in the manner described herein without analyzing the videos to determine whether faces or other identifying information are present.

After acquisition of a first image, a second image may be generated by modifying one or more characteristics of the first image to obscure the face of the user, or other identifying information. Characteristics of the first image that are modified may include one or more of a contrast value, a brightness value, one or more hues or color channel values, and so forth. The second image may then be analyzed to verify that the face of the user or other identifying information is not present. In some implementations, this analysis may include use of a face detection algorithm to determine that a face is not detected in the second image. For example, a face detection algorithm may determine a confidence value indicative of the presence or absence of a face in an image. A relationship between the confidence value and a threshold value may be used to determine that a face is not present in the second image. In other implementations, analysis of the second image may include a determination that at least a threshold quantity of pixels within the second image have a color value or another image characteristic within a threshold of an average color value of pixels for a region that includes identifying information. For example, such an analysis may indicate that the majority of pixels within a region of an image that includes identifying information have been brightened to a similar degree or changed to a similar color. Modification of a region of an image in this manner may cause the identifying information to no longer be recognizable to a viewer.

The second image may also be analyzed to determine that performance of an action by the user, or other non-identifying information that may be useful to train a neural network or perform another function, is present in the second image and has not been obscured. For example, an image may be analyzed to determine that a position of the user's body, interactions between the user and other objects, and so forth are able to be identified using an image recognition algorithm, or processed using a machine learning algorithm.

Because pixels representing the face of a user typically have color values that are similar to one another, a small modification to a contrast value for an image may obscure a user's face to a viewer, while other objects, such as a user's clothing, a background, or objects with which the user interacts may remain usable to perform a function after such a modification. As a result, an image may be modified in a manner that obscures identifying information to protect the privacy and anonymity of a user, while retaining other information for a particular purpose, without requiring use of computationally intensive or potentially inaccurate techniques to obscure selected portions of an image.

FIG. 1 depicts an implementation of a system 100 for modifying an image to remove information that may be used to identify a particular user 102 while retaining other information that may be used to perform a function. At a first time, a first image 104 may be acquired, such as by using a camera. In some implementations, the camera may transmit the first image 104 to a computing device 106 for analysis and processing. In other implementations, the functions described with regard to the computing device 106 may be performed using a processor or computing device associated with the camera. For example, the camera may include one or more processors, memories, and so forth, which may execute stored instructions to analyze images, modify images, generate additional image data, and so forth. As another example, the camera may be configured to generate images having a particular contrast value, brightness value, or other characteristic to obscure identifying information when acquiring the images. Therefore, while FIG. 1 depicts the computing device 106 as a server, in other implementations, any number and any type of computing devices 106, including, without limitation, cameras, servers, personal computing devices, portable computing devices, wearable computing devices, and so forth may be used.

The first image 104 may depict the user 102 performing an activity, such as interacting with one or more objects 108. For example, the first image 104 may depict the user 102 in a store, warehouse, or other environment where the user 102 may remove items from a shelf or container, place items into the shelf or container, and so forth. The first image 104 may also depict one or more portions of the user's 102 body, which may be used to determine an activity performed by the user 102. For example, the first image 104 may be used to determine whether the user 102 is standing, sitting, prone, reaching toward an object 108, facing an object 108, and so forth.

In some cases, the first image 104 may include information that may be used to identify the user 102 ("identifying information"). For example, FIG. 1 depicts the first image 104 including a first region 110, shown as a bounding box, in which a face of the user 102 is visible. Other types of identifying information may include text on clothing or objects worn or carried by the user 102, text on signs, vehicles, or other objects within the first image 104, and so forth. The presence of identifying information in the first image 104 may impact the privacy of the user 102 if the first image 104 is viewed by others. However, obscuring the identifying information may enable other information in the first image 104 to be used while maintaining the anonymity of the user 102. FIG. 1 also depicts the first image 104 including a second region 112, such as one or more portions of the first image 104 outside of the first region 110. In the second region 112, non-identifying information may be visible. In some cases, non-identifying information may be usable to perform a function. For example, images that depict the user 102 interacting with an object 108 may be used as inputs to train a machine learning algorithm to identify the activities performed by users 102 when subsequent images are acquired.

FIG. 1 depicts the computing device 106 determining one or more image characteristics 114(1) associated with the first image 104. In some implementations, image characteristics 114(1) may include an identifier associated with the first image 104 and a source of the first image, such as an indication of a camera that acquired the first image 104 or a location where the first image 104 was acquired. In some implementations, the image characteristics 114(1) may also include an indication of whether the first image 104 includes identifying information. For example, a face detection algorithm may be used to determine whether a face is detected in the first image 104. In some implementations, a face detection algorithm may utilize a Haar cascade face detector, a trained artificial neural network, a histogram of gradients face detector, and so forth. For example, the face detection algorithm may determine a face bounding box that is indicative of a portion of the first image 104 that may represent a face. Continuing the example, the face detection algorithm may generate a confidence score indicative of the likelihood that the first image 104 includes a face. If the confidence score exceeds a threshold, this may indicate that the first image 104 most likely includes a face. In some implementations, the image characteristics 114(1) may include an indication of whether the first image 104 includes information that may be used to perform a function, such as training a neural network or other type of machine learning algorithm. For example, the machine learning algorithm or another type of image analysis may be used to determine whether a body position of the user 102 or interactions between the user 102 and one or more objects 108 may be determined from the first image 104. The image characteristics 114(1) may also include one or more values indicative of the manner in which the first image 104 is displayed. For example, FIG. 1 depicts the image characteristics 114(1) including a contrast value associated with the first image 104. In other cases, image characteristics 114(1) may include a brightness value, values associated with one or more color channels or hues, and so forth.

If the user 102 opts-in or otherwise authorizes use of the first image 104 to perform one or more functions, identifying information may be removed from the first image 104 to protect the privacy of the user 102 prior to temporary storage. The computing device 106, or another computing device 106 in communication therewith, may be used to generate a second image 116 by modifying one or more of the image characteristics 114(1) associated with the first image 104. Generation of the second image 116 may include modifying the first image 104 to form the second image 116, overwriting the first image 104 with the second image 116, or generating the second image 116 as a separate image. For example, the second image 116 may be generated, based on the first image 104, by generating a separate image having a different contrast value than the first image 104.

The second image 116 may include one or more image characteristics 114(2) that differ from the image characteristics 114(1) of the first image 104. For example, a contrast value or another image characteristic 114(2) associated with the second image 116 may be selected to obscure identifying information present in the first image 104, while retaining non-identifying information that may be used to perform a function. Continuing the example, FIG. 1 depicts the second image 116 having a greater contrast value than the first image 104. As a result, in a third region 118 of the second image 116, which corresponds to the first region 110 of the first image 104, identifying information, such as a face of the user 102, is no longer discernable to a viewer. For example, a viewer that sees the second image 116 may be unable to identify the particular user 102 that is shown. In a fourth region 120 of the second image 116, which corresponds to the second region 112 of the first image 104, non-identifying information may still be used to train a machine learning algorithm or perform one or more other functions. For example, because color values associated with pixels representing the face of the user 102 may typically be fairly uniform in color, a small change in a contrast value may cause the face of the user 102 to be obscured when viewed by an individual. However, color values associated with the object(s) 108, clothing worn by the user 102, a background within the first image 104, and so forth may differ from those associated with the face of the user 102. As a result, a small change in the contrast value may not obscure at least a portion of the non-identifying information. The second image 116 may therefore include non-identifying information that may be used to train a machine learning algorithm while identifying information, such as the face of the user 102, is obscured. After determining that the second image 116 does not include identifying information, the second image 116 may be temporarily stored for use training a machine learning algorithm, or to perform another type of function.

Figure 2:
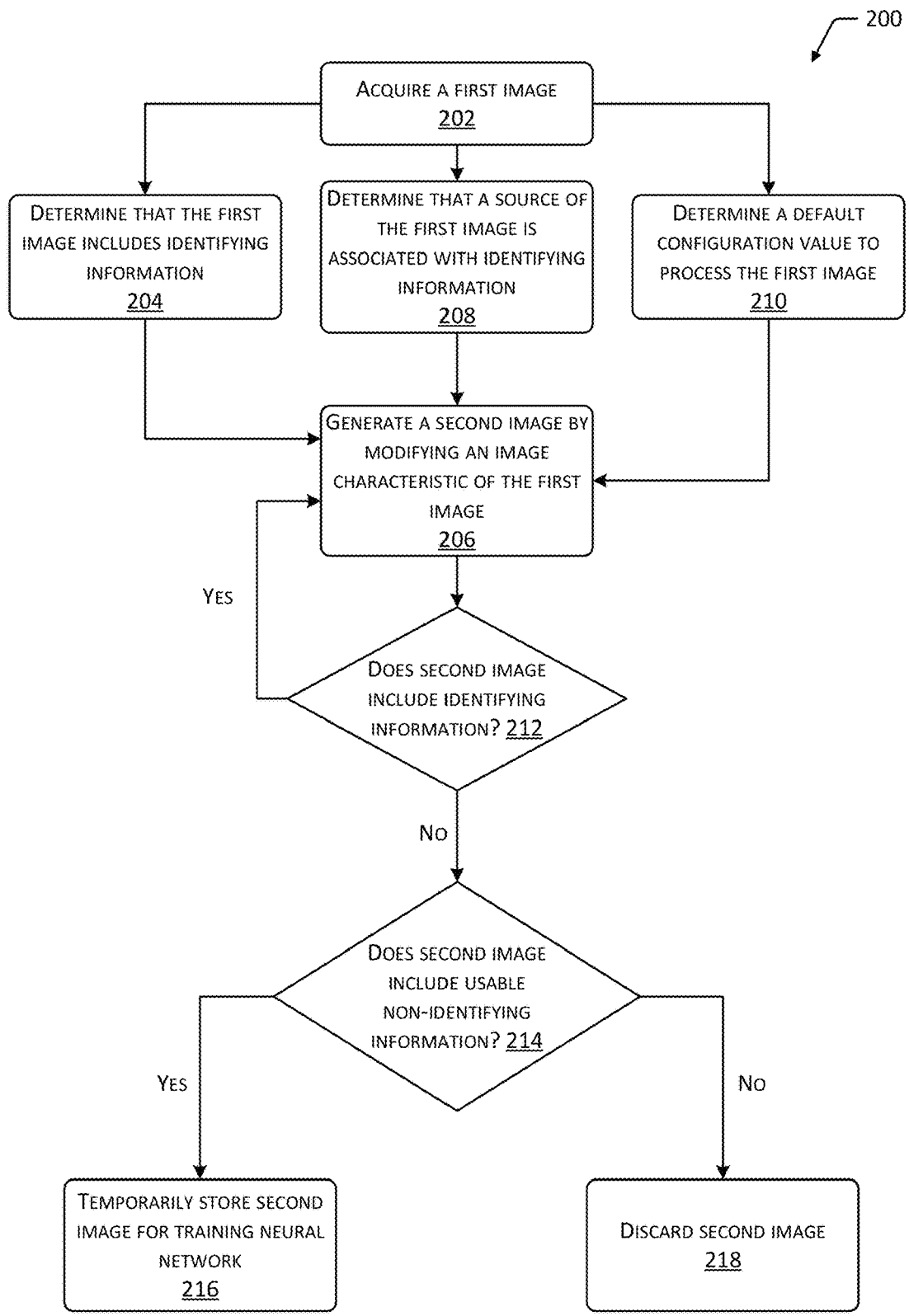
FIG. 2 is a flow diagram illustrating an implementation of a method for removing identifying information from an image while retaining usable non-identifying information.

FIG. 2 is a flow diagram 200 illustrating an implementation of a method for removing identifying information from an image while retaining usable non-identifying information. Images that depict users 102 that have opted-in or otherwise authorized use of the images to perform a function, such as training of a neural network, may be processed using the method shown in FIG. 2, to obscure identifying information and protect the privacy of the users 102. At 202, a first image 104 may be acquired. For example, a camera may acquire an image that depicts a user 102 performing an activity, such as interacting with one or more objects 108. The first image 104 may include a frame of a video or a still image. In some implementations, the process described in FIG. 2 may be performed using a processor or other computing device associated with a camera that acquired the first image 104. In other implementations, the first image 104 may be sent to a computing device 106 other than the camera, and the process described in FIG. 2 may be performed by one or more other computing devices 106. In some implementations, the process described in FIG. 2 may be performed on all acquired images. In other implementations, the process described in FIG. 2 may be performed on only a portion of the acquired images.

For example, at 204, a determination may be made that the first image 104 includes identifying information. Continuing the example, a face detection algorithm may be used to detect faces of users 102 within the first image 104. As another example, optical character recognition or text detection algorithms may be used to detect identifying information, such as license plate numbers, names, addresses, account numbers, numbers associated with payment mechanisms, and so forth. For images that are determined to include identifying information, the method may proceed to 206, and a second image 116 may be generated by modifying an image characteristic 114 of the first image 104. In some implementations, in cases where no identifying information is determined in an image, the first image 104 may be used to perform a function without generation of a second image 116.

As another example, at 208, a source of the first image 104 may be determined. The source of the first image 104 may be associated with identifying information. For example, a system 100 may be configured to generate a second image 116 by modifying an image characteristic 114 of the first image 104, as shown at 206, for all images acquired using a particular camera or set of cameras, or all images acquired from a particular location or type of location, such as a store or warehouse. Continuing the example, images that depict a location where users 102 may interact with objects 108 may be assumed to have a high probability of containing identifying information. In such a case, after determining the source of the first image 104, the method may proceed to 206. Processing all images received from a particular source or location may avoid use of computational resources to detect identifying information and may avoid inadvertently allowing others to access identifying information. In some implementations, in cases where an image is acquired from a source that is not associated with identifying information, the first image 104 may be used to perform a function without generation of a second image 116.

Additionally, in some implementations, the processes described at 204 and 208 may be performed in combination. For example, a second image 116 may be generated by modifying an image characteristic 114 of a first image 104 for all images acquired from a particular source, while other images from other sources may be analyzed to determine whether the other images include identifying information prior to generation of a second image 116.

In other implementations, at 210, a determination may be made that a default configuration value exists to process the first image 104. For example, a system 100 may be configured to generate a second image 116 by modifying an image characteristic 114 for all images that are acquired, independent of the source of the first image 104 or whether the first image 104 is determined to include identifying information. Processing of images without analyzing the images to determine the presence or absence of identifying information may conserve time and computational resources, and may avoid inaccuracy associated with face detection algorithms or other methods for determining identifying information. As a result, inadvertent disclosure of private information may be prevented. In other cases, a default configuration value may cause processing of images based on other traits of the images, such as the dates or times at which the images are acquired, colors or other characteristics of the images themselves, and so forth.

Independent of whether step 204, 208, or 210 is performed, at 206, a second image 116 may be generated by modifying an image characteristic 114 of the first image 104. In some implementations, the image characteristic 114 may include a contrast value associated with the first image 104. For example, increasing or decreasing a contrast value may cause pixels associated with the face of a user 102 to become more uniform in color, obscuring the face and causing a region of the second image 116 that includes the face to become unusable to identify a particular user 102. In other implementations, the image characteristic 114 may include a brightness value or a value associated with a color channel. In some implementations, the image characteristic 114 may be modified for the entire first image 104, rather than particular regions thereof. For example, changing a contrast value for an entire image may conserve time and computational resources and avoid inaccuracy associated with determining particular regions of the image and modifying image characteristics 114 for only those regions. In other implementations, image characteristics 114 may be modified for only particular regions of an image based on one or more configuration values or settings. For example, a particular region of the first image 104 that depicts one or more objects in a store or warehouse may remain unmodified to prevent obscuring information that may be used to train a neural network.

At 212, the second image 116 may be analyzed to determine whether the second image 116 includes identifying information. Verifying that the second image 116 does not include identifying information prior to temporary storage and use of the second image 116 may avoid inadvertent disclosure of private information associated with a user 102. For example, the second image 116 may include a contrast value or other image characteristic 114 that differs from a corresponding image characteristic 114 of the first image 104. If the first image 104 did not include identifying information, or if use of a different value for the image characteristic 114 successfully obscures the identifying information, then a face detection algorithm or other process may fail to determine the presence of a face or other identifying information in the second image 116. In some implementations, if at least a threshold quantity of pixels in the second image 116 are determined to have a color value or other image characteristic 114 within a threshold value of an average value for the image characteristic 114, this may indicate that the identifying information has been obscured. For example, if at least a threshold quantity of pixels within a region of the second image 116 that corresponds to a region of the first image 104 where a face was located have a similar color value, this may indicate that the face is no longer recognizable to a viewer.

In other cases, use of a different value for an image characteristic 114 may not successfully obscure identifying information in the second image 116. In such a case, the method may return to 206, and the image characteristic 114, or a different image characteristic 114, of the second image 116 may be modified. The second image 116 may then be analyzed again to determine whether identifying information is included in the second image 116. In cases where identifying information cannot be obscured, the second image 116 may be discarded to protect the privacy of the user 102. However, if it determined that the second image 116 does not include identifying information, the method may proceed to 214.

At 214, the second image 116 may be analyzed to determine whether the second image 116 includes usable non-identifying information. For example, the second image 116 may be analyzed using a machine learning algorithm to determine whether the second image 116 is usable as an input to train the machine learning algorithm. In other cases, other types of image analysis algorithms may be used to determine whether the second image 116 includes particular types of information, such as objects 108, positions of a user's 102 body, interactions between a user 102 and an object 108, and so forth. In cases where the second image 116 includes usable non-identifying information, the method may proceed to 216, and the second image may be temporarily stored for training a neural network, or performance of another function. In some implementations, if the second image 116 does not include usable non-identifying information, the method may proceed to 218, and the second image 116 may be discarded. In other implementations, step 214 may be omitted, and all second images 116 that do not include identifying information may be used as inputs to train a machine learning algorithm, or to perform another function.

Figure 3:
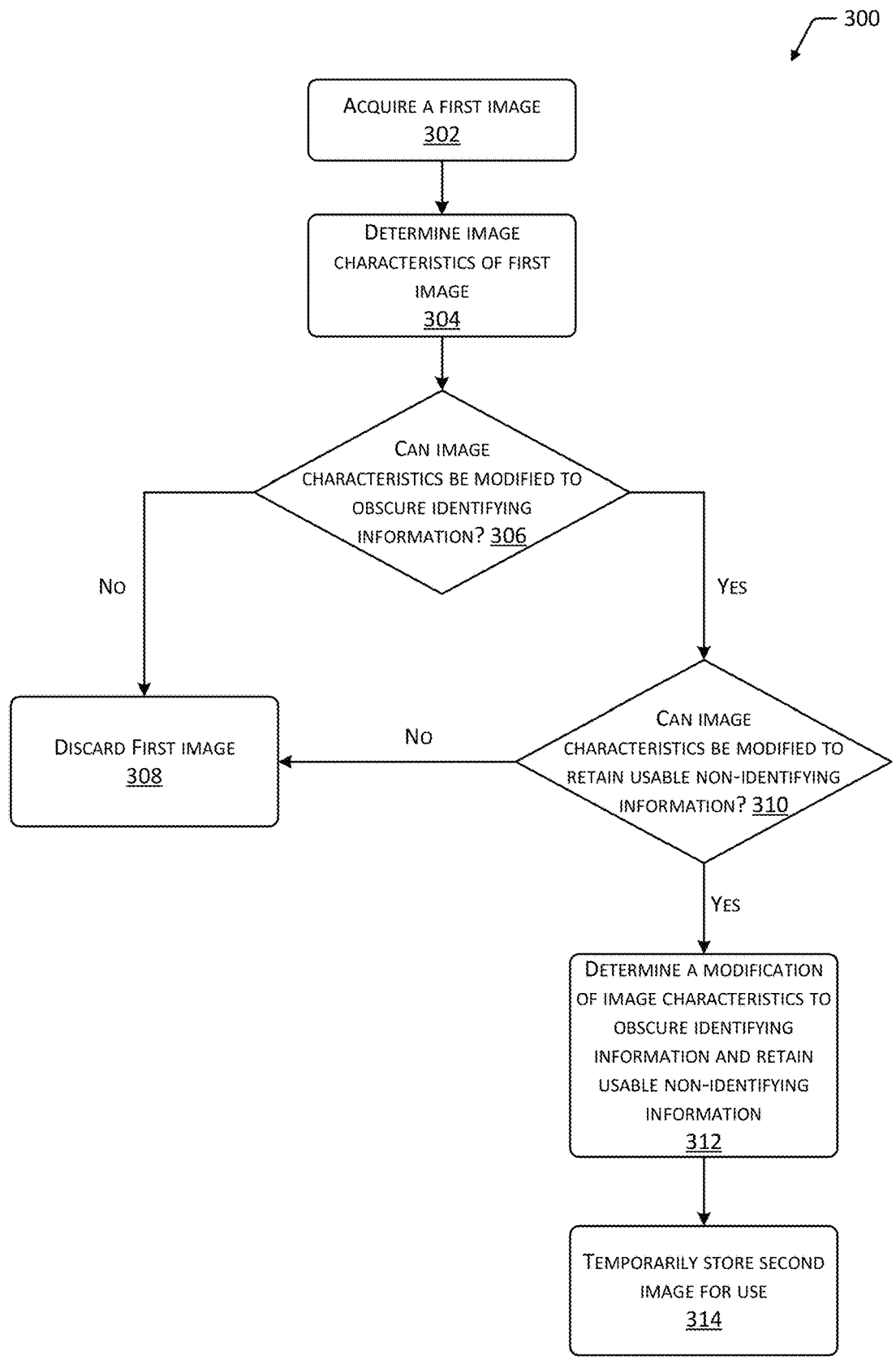
FIG. 3 is a flow diagram illustrating an implementation of a method for determining a modification to an image to remove identifying information based on the characteristics of the image.

FIG. 3 is a flow diagram 300 illustrating an implementation of a method for determining a modification to an image to remove identifying information based on the characteristics of the image. At 302, a first image 104 may be acquired. As described with regard to FIG. 2, a camera may acquire the first image 104. In other implementations, an existing first image 104 may be received from one or more other computing devices 106 or accessed in data storage.

At 304, image characteristics 114 of the first image 104 may be determined. Image characteristics 114 may include a contrast value, a brightness value, color or hue values for one or more pixels of the first image 104, and so forth. Image characteristics 114 may also include color values within particular regions of the first image 104. For example, pixels within a first region 110 of the first image 104 that represent the face of a user 102 may have a first average color value, while pixels within a second region 112 that represent the user's 102 clothing or other objects 108 may have a second average color value. Additionally, in some implementations, color values for pixels representing a background of the first image 104 may be determined. In some cases, color values associated with a background of the first image 104 may be determined through analysis of the first image 104. In other implementations, known color values associated with a background within a field of view of a camera that acquired the first image 104 may be stored and accessed when determining the image characteristics 114 associated with the first image 104.

At 306, the image characteristics 114 of the first image 104 may be analyzed to determine whether the image characteristics 114 can be modified to obscure identifying information in the first image 104. For example, an average color value of pixels in a region of the first image 104 that includes a face may be determined. If at least a threshold quantity of the pixels within the region have a color value within a threshold value of the average color value, this may indicate that a modification to a contrast value or other image characteristic 114 may successfully obscure the face. As another example, if at least a threshold quantity of the pixels within the region have a brightness value within a threshold value of an average brightness value, it may be possible to obscure the face by modifying one or more image characteristics 114. In cases where pixels within a region of the first image 104 that include identifying information are not able to be obscured by modifying one or more image characteristics 114, or if values for image characteristics 114 of at least a threshold quantity of pixels in the region deviate from an average value, the method may proceed to 308, and the first image 104 may be discarded to protect the privacy of the user 102. In cases where the image characteristics 114 of the first image 104 may be modified in a manner that obscures the identifying information, the method may proceed to 310.

At 310, the image characteristics 114 may be analyzed to determine whether the image characteristics 114 can be modified to retain usable non-identifying information. For example, an average color value of pixels in a region of the first image 104 that includes a face may be determined. If at least a threshold quantity of the pixels within a different region of the first image 104 that depicts non-identifying information have a color value that differs from the average color value by at least a threshold, this may indicate that a modification to a contrast value or other image characteristic 114 to obscure the face may not obscure the non-identifying information. As another example, if at least a threshold quantity of the pixels that depict non-identifying information have a brightness value that differs from an average brightness value of the pixels that depict identifying information, modifying the image characteristics 114 to obscure the identifying information may not obscure the non-identifying information. In cases where modifying the image characteristics 114 of the first image 104 will obscure the non-identifying information, the method may proceed to 308 and the first image 104 may be discarded. In cases where the image characteristics 114 may be modified in a manner that obscures identifying information in the first image 104 and retains usable non-identifiable information, the method may proceed to 312.

At 312 a modification to the image characteristics 114 to obscure the identifying information and retain the usable non-identifying information may be determined. For example, based on one or more of the color values, brightness values, contrast values, or other image characteristics 114 of the first image 104, a second image 116 may be generated. The second image 116 may have a value for a particular image characteristic 114 or set of image characteristics 114 that differs from the value of the image characteristic(s) 114 for the first image 104. The value for each of the image characteristics 114 for the second image 116 may be determined based on the initial image characteristics 114 of the first image 104. For example, if a threshold number of pixels that represent a face of a user 102 are within a threshold value of an average color value, while a threshold number of pixels that represent other objects 108 and non-identifying information differ from the average color value by at least a threshold value, a modification to the contrast value for the first image 104 may obscure the identifying information while retaining the non-identifying information. Any number and any combination of image characteristics 114 may be selected for the second image 116 based on the initial image characteristics 114 of the first image 104. After generation of the second image 116, at 314, the second image 116 may be temporarily stored for use.

Figure 4:
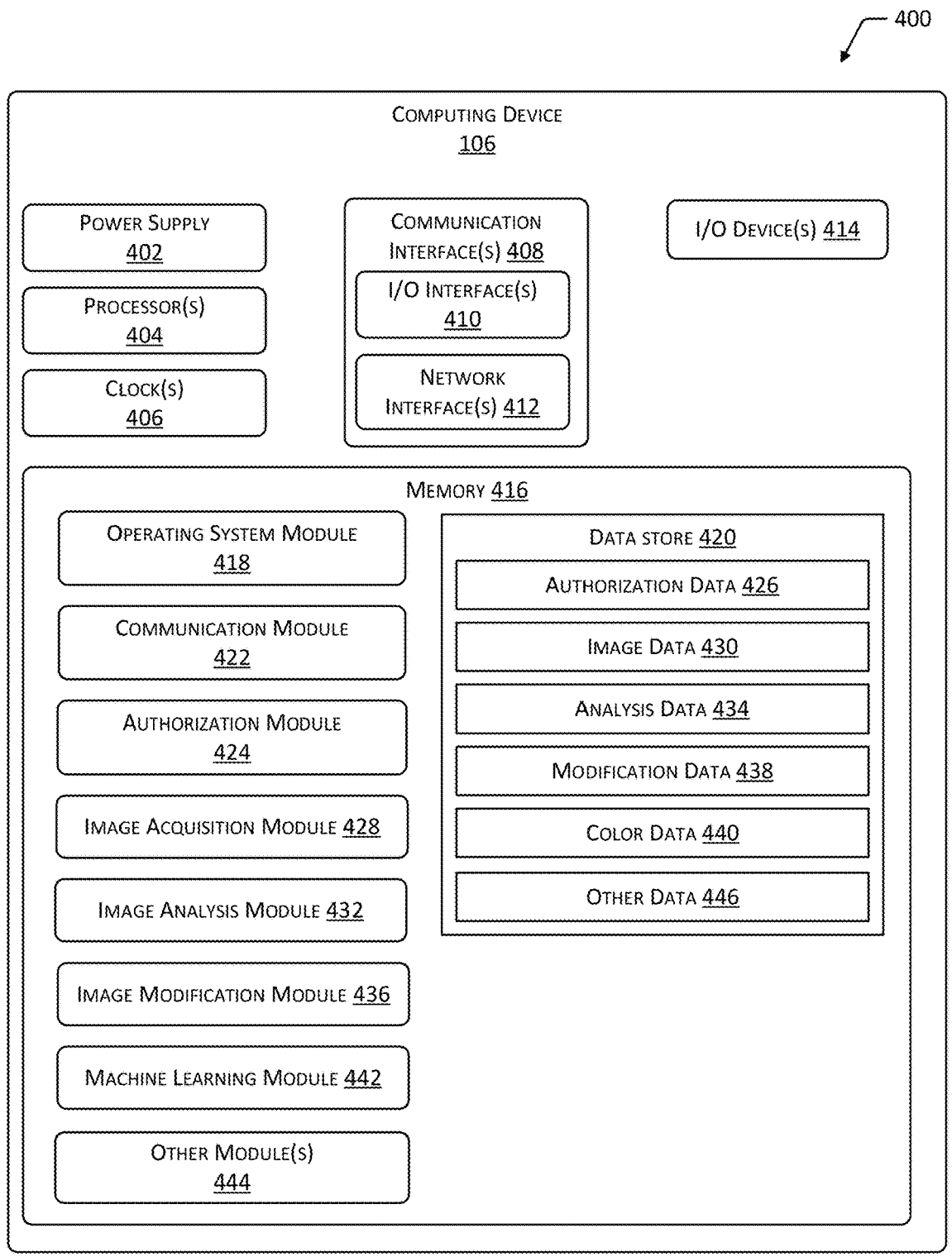
FIG. 4 is a block diagram depicting an implementation of a computing device within the present disclosure.

FIG. 4 is a block diagram 400 depicting an implementation of a computing device 106 within the present disclosure. The computing device 402 may include one or more servers, computing devices 106 associated with cameras, or other computing devices 106 in communication therewith. While FIG. 4 depicts a single block diagram 400 of a computing device 106, any number and any type of computing devices 106 may be used to perform the functions described herein. For example, a camera may acquire a first image 104, then provide the first image 104 to a server for generation of a second image 116 having differing image characteristics 114. As another example, a camera may acquire a first image 104, a processor or computing device 106 associated with the camera may generate a second image 116 based on the first image 104, and the second image 116 may then be transmitted to a server or other computing device 106 for storage, performance of a function, or additional processing. Any number and any type of computing devices 106 may be used to perform the functions described herein.

One or more power supplies 402 may be configured to provide electrical power suitable for operating the components of the computing device 106. In some implementations, the power supply 402 may include a rechargeable battery, fuel cell, photovoltaic cell, power conditioning circuitry, and so forth.

The computing device 106 may include one or more hardware processor(s) 404 (processors) configured to execute one or more stored instructions. The processor(s) 404 may include one or more cores. One or more clock(s) 406 may provide information indicative of date, time, ticks, and so forth. For example, the processor(s) 404 may use data from the clock 406 to generate a timestamp, trigger a preprogrammed action, and so forth.

The computing device 106 may include one or more communication interfaces 408, such as input/output (I/O) interfaces 410, network interfaces 412, and so forth. The communication interfaces 408 may enable the computing device 106, or components of the computing device 106, to communicate with other computing devices 106 or components of the other computing devices 106. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input devices or output devices associated with the computing device 106. For example, I/O devices 414 may include touch sensors, displays, touch sensors integrated with displays (e.g., touchscreen displays), keyboards, mouse devices, microphones, image sensors, cameras, scanners, speakers, haptic devices, printers, and so forth. In some implementations, the I/O devices 414 may be physically incorporated with the computing device 106. In other implementations, I/O devices 414 may be externally placed.

The network interfaces 412 may be configured to provide communications between the computing device 106 and other devices, such as the I/O devices 414, routers, access points, and so forth. The network interfaces 412 may include devices configured to couple to one or more networks including local area networks (LANs), wireless LANs (WLANs), wide area networks (WANs), wireless WANs, and so forth. For example, the network interfaces 412 may include devices compatible with Ethernet, Wi-Fi, Bluetooth, ZigBee, Z-Wave, 3G, 4G, 5G, LTE, and so forth.

The computing device 106 may include one or more busses or other internal communications hardware or software that allows for the transfer of data between the various modules and components of the computing device 106.

As shown in FIG. 4, the computing device 106 may include one or more memories 416. The memory 416 may include one or more computer-readable storage media (CRSM). The CRSM may be any one or more of an electronic storage medium, a magnetic storage medium, an optical storage medium, a quantum storage medium, a mechanical computer storage medium, and so forth. The memory 416 may provide storage of computer-readable instructions, data structures, program modules, and other data for the operation of the computing device 106. A few example modules are shown stored in the memory 416, although the same functionality may alternatively be implemented in hardware, firmware, or as a system on a chip (SoC).

The memory 416 may include one or more operating system (OS) modules 418. The OS module 418 may be configured to manage hardware resource devices such as the I/O interfaces 410, the network interfaces 412, the I/O devices 414, and to provide various services to applications or modules executing on the processors 404. The OS module 418 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 420 and one or more of the following modules may also be associated with the memory 416. The modules may be executed as foreground applications, background tasks, daemons, and so forth. The data store(s) 420 may use a flat file, database, linked list, tree, executable code, script, or other data structure to store information. In some implementations, the data store(s) 420 or a portion of the data store(s) 420 may be distributed across one or more other devices including other computing devices 106, network attached storage devices, and so forth.

A communication module 422 may be configured to establish communications with one or more other computing devices 106. Communications may be authenticated, encrypted, and so forth.

The memory 416 may also store an authorization module 424. The authorization module 424 may receive input from one of more users 102 authorizing use of images that depict the user(s) 102 for performance of one or more functions, such as training of a neural network. For example, a user 102 may be presented with a user interface or other type of prompt requesting the user 102 to opt-in or provide another form of authorization indicating consent for use of images. Indications of users 102 that have provided authorization, or users 102 that have declined to provide authorization, may be stored as authorization data 426. Images that depict users 102 that have not provided authorization may be discarded or otherwise prevented from use performing one or more functions.

The memory 416 may additionally store an image acquisition module 428. The image acquisition module 428 may acquire image data 430 indicative of one or more users 102, objects 108, and so forth within a field of view of a camera. For example, the image acquisition module 428 may control one or more image sensors, shutters, lenses, or other components associated with a camera and may cause the camera to acquire an image. The image acquisition module 428 may then either cause the image to be transmitted to a server or other computing device 106 for processing, or the image acquisition module 428 may process the image.

The memory 416 may also store an image analysis module 432. The image analysis module 432 may determine image characteristics 114 associated with an acquired image, an image generated by the computing device 106, or an image stored in the memory 416. For example, analysis data 434 may indicate one or more rules, algorithms, or types of data to be determined in an image. Based on the analysis data 434 and an acquired image, the image analysis module 432 may determine the presence or absence of identifying information, the presence or absence of information that may be usable to train a machine learning algorithm or perform another function, contrast or brightness values associated with the image, colors present in the image, color values associated with the image, and so forth. For example, the image analysis module 432 may include a face detection algorithm that may be used to determine whether a face of a user 102 is detectable in an image. In some implementations, the image analysis module 432, or another module in the memory 416, may provide various processing functions, such as de-noising, filtering, and so forth. In other implementations, the image analysis module 432 may process an image, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image. In still another implementation, functions such as those in the Machine Vision Toolbox available using MATLAB as developed by Math Works, Inc. of Natick, Mass., USA, may be utilized. Techniques such as artificial neural networks, convolutional neural networks, active appearance models, active shape models, principal component analysis, cascade classifiers, and so forth, may also be used to process images or other data. For example, an artificial neural network may be trained using a supervised learning algorithm to identify images of particular objects 108, activities performed by users 102, and so forth. Once trained, the neural network may be provided with images and produce output indicative of an action performed by a user 102, an object 108 with which a user 102 interacted, and so forth.

The memory 416 may store an image modification module 436. The image modification module 436 may generate a second image 116 based on the characteristics of a first image 104 that was acquired by the computing device 106. For example, modification data 438 may associate values for image characteristics 114 for the second image 116 with values of image characteristics 114 of the first image 104. Based on the determined image characteristics 114 of the first image 104 and the modification data 438, the second image 116 may be generated with image characteristics 114 that may obscure identifying information within the second image 116 while retaining non-identifying information that may be usable to train a neural network or perform another function. In some implementations, the image modification module 436 may access color data 440, indicative of one or more colors included in a background within a field of view of a camera. The color data 440 may be used to determine values for image characteristics 114 of the second image 116. For example, if the colors of a background indicated in the color data 440 differ from colors associated with a user 102 within an image, changes to a contrast value may obscure a face of the user 102 while a position of the user's 102 body remains visible in the image.

The memory 416 may also store a machine learning module 442. The machine learning module 442 may use one or more images generated by the image modification module 436 as inputs to train one or more machine learning algorithms. In some implementations, the machine learning module 442 may determine whether an image includes information that may be used as an input to train a machine learning algorithm, such as by performing one or more image analysis processes or attempting to use an image as a training input for a neural network.

Other modules 444 may also be present in the memory 416. For example, other modules 444 may include modules for generating user interfaces for acquiring authorization from users 102 for use of images, presenting deidentified images to users 102 for manual review, presenting output associated with generation of images or training of machine learning algorithms, and so forth. Other modules 444 may include modules for determining characteristics of a computing device 106, such as hardware or software components of a computing device 106, applications executed by the computing device 106, an identifier or location associated with a computing device 106, networks accessible to the computing device 106, and so forth. Other modules 106 may also include encryption modules to encrypt and decrypt communications between computing devices 106, authentication modules to authenticate communications sent or received by computing devices 106, administrative modules to assign, determine, and manage user permissions to access or modify data associated with computing devices 106, and so forth.

Other data 446 within the data store(s) 420 may include configurations, settings, preferences, and default values associated with computing devices 106. For example, other data 446 may include configuration data to control particular types of information that are determined to be identifying information, particular types of information that are usable to train machine learning algorithms, particular sources of images or locations associated with images in response to which a second image 116 may be generated, and so forth. Other data 446 may also include encryption keys and schema, access credentials, and so forth.

In different implementations, different computing devices 106 may have different capabilities or capacities. For example, servers may have greater processing capabilities or data storage capacity than computing devices 106 associated with cameras.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
    access a first image associated with performance of an action by a user;
    determine that a region of the first image includes a face of the user;
    generate a second image by modifying a contrast value associated with the first image;
    determine an average value for a characteristic of pixels within the region of the first image;

determine, for at least a threshold portion of the pixels within the region, that a value for the characteristic is within a first threshold value of the average value;

determine that the performance of the action is visible in the second image; and in response to determining that the value for the at least a threshold portion of the pixels is within the first threshold value of the average value, train a machine learning algorithm using the second image as an input.

2. The system of claim 1, wherein the computer-executable instructions to determine that the performance of the action is visible in the second image include computer-executable instructions to:

determine that the second image includes one or more of: a body position of the user or an interaction between the user and an object.

3. The system of claim 1, further comprising computer-executable instructions to:

determine an average color value of pixels in the region of the first image that includes the face; and determine that at least a threshold quantity of the pixels within the region have a color value within a second threshold value of the average color value.

4. A method comprising:

acquiring a first image having:
a first region that includes identifying information that is usable to identify a user; and
a second region that includes non-identifying information and does not include the identifying information;

generating a second image by modifying at least one image characteristic of the first image;

determining an average value for the at least one image characteristic for pixels within the first region;

determining, for at least a threshold portion of the pixels within the first region, that a value for the at least one image characteristic is within a first threshold value of the average value;

determining that at least a portion of the non-identifying information is present in the second image; and in response to determining that the value for the at least a threshold portion of the pixels is within the first threshold value of the average value, storing the second image.

5. The method of claim 4, further comprising:

determining that the first image includes the identifying information, wherein the second image is generated in response to the determining that the first image includes the identifying information.

6. The method of claim 5, wherein the determining that the first image includes the identifying information includes using a face detection algorithm to determine a face within the first image.

7. The method of claim 4, further comprising using a face detection algorithm to determine an absence of a face in the second image.

8. The method of claim 4, wherein the determining the at least a portion of the non-identifying information is present in the second image includes providing the second image to a machine learning algorithm and determining that the machine learning algorithm determines the non-identifying information in the second image.

9. The method of claim 4, wherein the at least one image characteristic includes one or more of a contrast value, a brightness value, or a value associated with a color channel.

10. The method of claim 4, further comprising:

determining an average color value for pixels within the first region of the first image; and determining that each of at least a threshold quantity of pixels have a color value within a second threshold value of the average color value, wherein the second image is generated in response to the at least the threshold quantity of pixels each having the color value within the second threshold value of the average color value.

11. A system comprising:

one or more memories storing computer-executable instructions; and one or more hardware processors to execute the computer-executable instructions to:

acquire a first image having a first region that includes identifying information and a second region that includes non-identifying information;

generate a second image by modifying a first image characteristic of the first image to at least partially obscure the identifying information;

determine an average value for one or more of:
the first image characteristic for pixels within a third region of the second image that corresponds to the first region of the first image; or
a second image characteristic for the pixels within the third region of the second image;

determine, for at least a first threshold quantity of the pixels within the third region, a value for the one or more of the first image characteristic or the second image characteristic;

determine that the value for the at least a first threshold quantity of pixels is within a threshold value of the average value; and in response to the value for the at least a first threshold quantity of the pixels being within the threshold value of the average value, determine that the non-identifying information is usable to perform a function.

12. The system of claim 11, wherein the one or more hardware processors and the one or more memories are incorporated within a camera that acquires the first image, the second image is generated within the one or more memories, and the function includes transmission of the second image to a computing device.

13. The system of claim 11, further comprising computer-executable instructions to:

determine one or more first color values associated with the first region of the first image;

determine one or more second color values associated with the second region of the first image; and determine the first image characteristic based on the one or more first color values and the one or more second color values.

14. The system of claim 11, further comprising computer-executable instructions to:

access color data indicative of color values associated with a background within a field of view of a camera that acquired the first image; and determine the first image characteristic based on the color data.

15. The system of claim 11, wherein the computer-executable instructions to generate the second image by modifying the first image characteristic of the first image include computer-executable instructions to modify the first image characteristic of the first region and the second region of the first image.

16. The system of claim 11, wherein the computer-executable instructions to generate the second image by modifying the first image characteristic of the first image include computer-executable instructions to:
    generate a third image by modifying the first image characteristic of the first image from a first value to a second value;
    determine that the third image includes the identifying information;
    generate the second image by modifying the first image characteristic of the third image from the second value to a third value; and
    determine that the identifying information is at least partially obscured in the second image.

17. The system of claim 11, further comprising computer-executable instructions to:
    determine, using a face detection algorithm, an outcome indicative of one or more of:
        a first confidence value indicative of an absence of a face in the second image is greater than a first threshold confidence value; or
        a second confidence value indicative of a presence of a face in the second image is less than a second threshold confidence value;
wherein the second image is used to perform the function in response to the outcome.

18. The system of claim 11, wherein the second image is used to perform the function in response to the at least a first threshold quantity of pixels having the value for the second image characteristic within the threshold value of the average value.

19. The system of claim 18, further comprising computer-executable instructions to:
    determine that a fourth region of the second image that corresponds to the second region of the first image includes at least a second threshold quantity of pixels having a second value for the one or more of the first image characteristic or the second image characteristic, wherein the second value differs from the average value by at least the threshold value, and wherein the second image is used to perform the function further in response to the at least a second threshold quantity of pixels having the second value for the second image characteristic that differs from the average value by at least the threshold value.

20. The method of claim 4, further comprising:
determining one or more first color values associated with the first region of the first image;
determining one or more second color values associated with the second region of the first image; and
determining the at least one first image characteristic based on the one or more first color values and the one or more second color values.

* * * * *